(12) United States Patent
Dahlberg et al.

(10) Patent No.: US 11,841,195 B2
(45) Date of Patent: Dec. 12, 2023

(54) MEANS FOR SENSING TEMPERATURE

(71) Applicant: SWEP INTERNATIONAL AB, Landskrona (SE)

(72) Inventors: Tomas Dahlberg, Helsingborg (SE); Sven Andersson, Hässleholm (SE)

(73) Assignee: SWEP INTERNATIONAL AB, Landskrona (SE)

( * ) Notice: Subject to any disclaimer, the term of this patent is extended or adjusted under 35 U.S.C. 154(b) by 23 days.

(21) Appl. No.: 16/470,130

(22) PCT Filed: Dec. 11, 2017

(86) PCT No.: PCT/EP2017/082228
§ 371 (c)(1),
(2) Date: Jun. 14, 2019

(87) PCT Pub. No.: WO2018/108816
PCT Pub. Date: Jun. 21, 2018

(65) Prior Publication Data
US 2019/0360768 A1    Nov. 28, 2019

(30) Foreign Application Priority Data

Dec. 16, 2016    (SE) .................................. 1651666-8

(51) Int. Cl.
*F28F 27/00*    (2006.01)
*F28D 9/00*    (2006.01)
(Continued)

(52) U.S. Cl.
CPC .............. *F28F 27/00* (2013.01); *F28D 9/005* (2013.01); *F28F 3/046* (2013.01); *G01K 13/02* (2013.01)

(58) Field of Classification Search
CPC ........... F28F 27/00; F28F 3/046; F28D 9/005; G01K 13/02
See application file for complete search history.

(56) References Cited

U.S. PATENT DOCUMENTS 5,178,207 A * 1/1993 Bergqvist .................. F28F 3/10
165/167
7,568,516 B2 * 8/2009 Bergqvist ............... F16J 15/064
165/11.1
(Continued)

FOREIGN PATENT DOCUMENTS

CN        2819192 Y     9/2006
CN      101023312 A     8/2007
(Continued)

OTHER PUBLICATIONS

WO2010017815A1 mt (Year: 2010).*
(Continued)

*Primary Examiner* — Gordon A Jones
(74) *Attorney, Agent, or Firm* — Merchant & Gould P.C.

(57) ABSTRACT

A brazed plate heat exchanger comprises a number of heat exchanger plates (100) provided with a pressed pattern comprising ridges (R) and grooves (G). The ridges and grooves of neighboring plates contact one another in order to keep the plates on a distance from one another under formation of interplate flow channels for media to exchange heat when the heat exchanger plates are placed in a stack to form the heat exchanger. Means (120a, 120b) are provided for allowing temperature measurement of a fluid present in a second flow channel counted from an end of the stack of heat exchanger plates (100).

2 Claims, 4 Drawing Sheets

(51) Int. Cl.
*F28F 3/04* (2006.01)
*G01K 13/02* (2021.01)

(56) References Cited

U.S. PATENT DOCUMENTS

| | | | | |
|---|---|---|---|---|
| 8,505,619 | B2* | 8/2013 | Persson | F24D 19/1051 |
| | | | | 165/166 |
| 9,395,125 | B2 | 7/2016 | Fox et al. | |
| 9,829,259 | B2* | 11/2017 | Nyander | F28F 3/00 |
| 2004/0134637 | A1* | 7/2004 | Helin | F28D 9/005 |
| | | | | 165/11.1 |
| 2008/0257538 | A1* | 10/2008 | Persson | F28F 27/00 |
| | | | | 165/287 |
| 2013/0075054 | A1 | 3/2013 | Fox et al. | |
| 2013/0206359 | A1* | 8/2013 | Bertilsson | G01M 3/40 |
| | | | | 165/11.1 |
| 2013/0233508 | A1* | 9/2013 | Cederberg | F28F 3/083 |
| | | | | 165/11.1 |
| 2015/0168075 | A1* | 6/2015 | Bertilsson | F28F 9/0243 |
| | | | | 165/166 |

FOREIGN PATENT DOCUMENTS

| | | | | |
|---|---|---|---|---|
| CN | 202675963 U | | 1/2013 | |
| CN | 203274588 U | | 11/2013 | |
| DE | 60015185 | | 2/2005 | |
| EP | 1362214 A1 | | 11/2003 | |
| EP | 2674715 A1 | | 12/2013 | |
| JP | 2011-196663 A | | 10/2011 | |
| JP | 2013178014 A | | 9/2013 | |
| SE | 342691 B | | 2/1972 | |
| WO | WO 02/070976 A1 | | 9/2002 | |
| WO | WO-2005057118 A1 | * | 6/2005 | ............ F28D 9/005 |
| WO | 2006027368 A1 | | 3/2006 | |
| WO | WO 2006/027368 A1 | | 3/2006 | |
| WO | WO-2010017815 A1 | * | 2/2010 | ......... F24D 19/1009 |
| WO | WO-2010140954 A1 | * | 12/2010 | ............ F28D 9/005 |

OTHER PUBLICATIONS

Chinese Office Action for CN Application No. 201780077892.7 dated Jun. 1, 2020 (8 pages), translation.
International Search Report and Written Opinion for PCT/EP2017/082228, dated Mar. 16, 2018.

* cited by examiner

MEANS FOR SENSING TEMPERATURE

This application is a National Stage Application of PCT/EP2017/082228, filed 11 Dec. 2017, which claims the benefit of priority to Swedish Patent Application No. 1651666-8, filed 16 Dec. 2016, which applications are incorporated herein by reference. To the extent appropriate, a claim of priority is made to each of the above disclosed applications.

TECHNICAL FIELD

The present invention relates to a brazed plate heat exchanger comprising a number of heat exchanger plates provided with a pressed pattern comprising ridges and grooves, said ridges and grooves of neighboring plates contacting one another in order to keep the plates on a distance from one another under formation of interplate flow channels for media to exchange heat when the heat exchanger plates are placed in a stack to form the heat exchanger.

BACKGROUND

Brazed plate heat exchangers are often used as evaporators and/or condensers in heating and cooling applications wherein a refrigerant is compressed, condensed and evaporated in order to utilize a low temperature source for evaporation and a high temperature source for the condensation.

In order to control such systems, it is common to use a controllable driving source for a compressor compressing gaseous refrigerant and a controllable expansion valve for controlling a pressure ratio between a high pressure side (where the refrigerant is condensed) and a low pressure side (where the refrigerant is evaporated). In order to get an as efficient process as possible, it is essential not to overheat the refrigerant vapor in the evaporator to a too large degree, but it is also crucial that all of the refrigerant is vaporized, since liquid phase refrigerant will ruin the compressor.

In order to enable an optimization of the system, it is crucial to be able to measure temperatures and pressure accurately.

In most applications, the refrigerant exchanges heat with a heat carrier, most commonly water or a brine solution, i.e. water with anti-freezing additives. In almost all cases, there are an uneven number of flow channels for the media to exchange heat, and the flow channels are almost always arranged such that the outer channels in the heat exchanger stack are used for the water or brine solution. This is quit logic, since the outer flow channels in the plate pack only have one heat exchanging plate surface, while the intermediate flow channels will exchange heat through both heat exchanger plates limiting the flow channels, meaning that it is impossible to accurately measure the temperature in the refrigerant channels.

SUMMARY

The present invention solves the above problem by providing means for allowing temperature measurement of a fluid present in a second flow channel counted from an end of the stack of heat exchanger plates.

In a first embodiment, the means for allowing temperature measurement of the fluid in the second flow channel comprises plan portions arranged to abut one another and hence allow for heat transfer from the second flow channel to a temperature sensor. This embodiment is advantageous in that identical heat exchanger plates may be used for the entire heat exchanger.

In a second embodiment, the means for allowing temperature measurement of the fluid in the second flow channel comprises a recessed portion provided in an outer heat exchanger plate, said recessed portion being provided with a pressed pattern corresponding to a pressed pattern of the neighboring heat exchanger plate, such that the pressed pattern of the recessed portion and the neighbouring plate snugly fits one another and hence provides for a heat transfer from the second flow channel to a temperature sensor. This embodiment is advantageous in that the heat transfer performance of the heat exchanger is equal to a heat exchanger not having means for measuring a fluid temperature of a second flow channel.

BRIEF DESCRIPTION OF THE DRAWINGS

In the following, the invention will be described with reference to the appended drawings, wherein:

FIG. 2b is an enlarged view of a portion of FIG. 2a;

FIG. 4a is an exploded perspective view of a heat exchanger according to the second embodiment; and FIG. 4b is a detail of the exploded perspective view of the heat exchanger according to the second embodiment shown in FIG. 4a.

DESCRIPTION OF EMBODIMENTS

Figure 1:
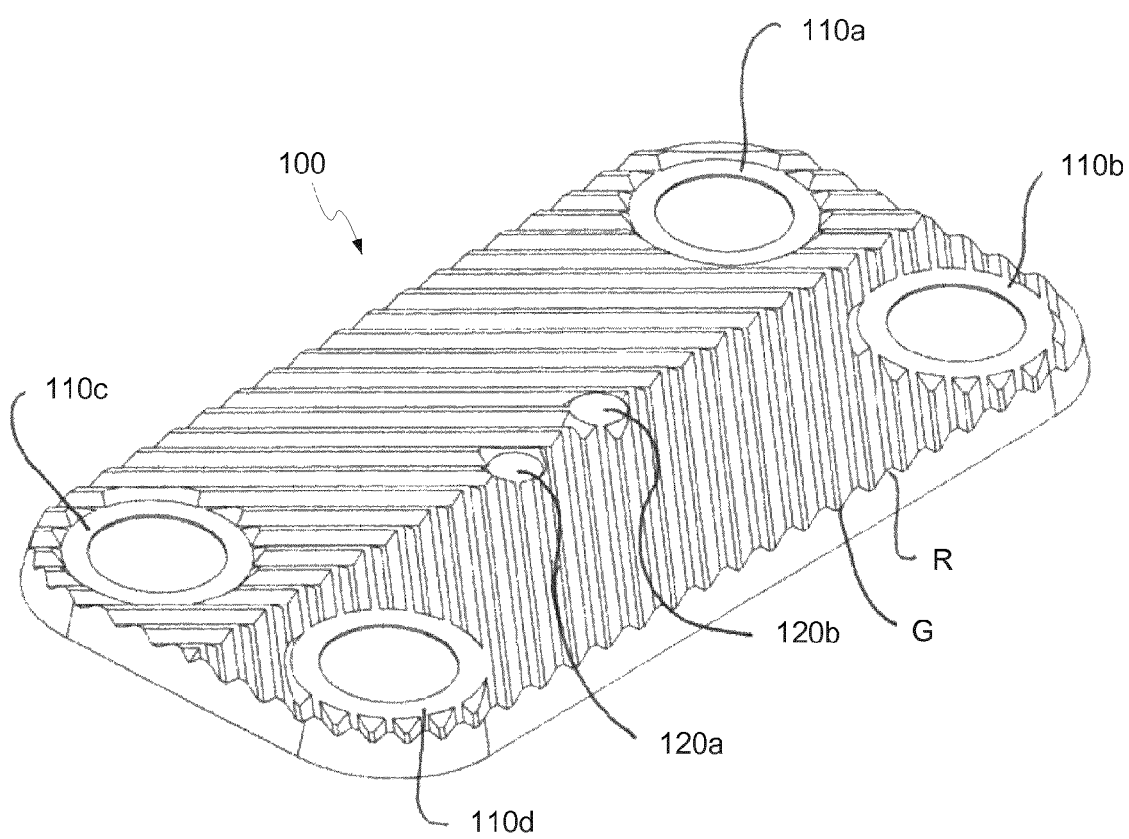
FIG. 1 is a perspective view of a heat exchanger plate comprised in a heat exchanger according to a first embodiment.
Figure 2A:
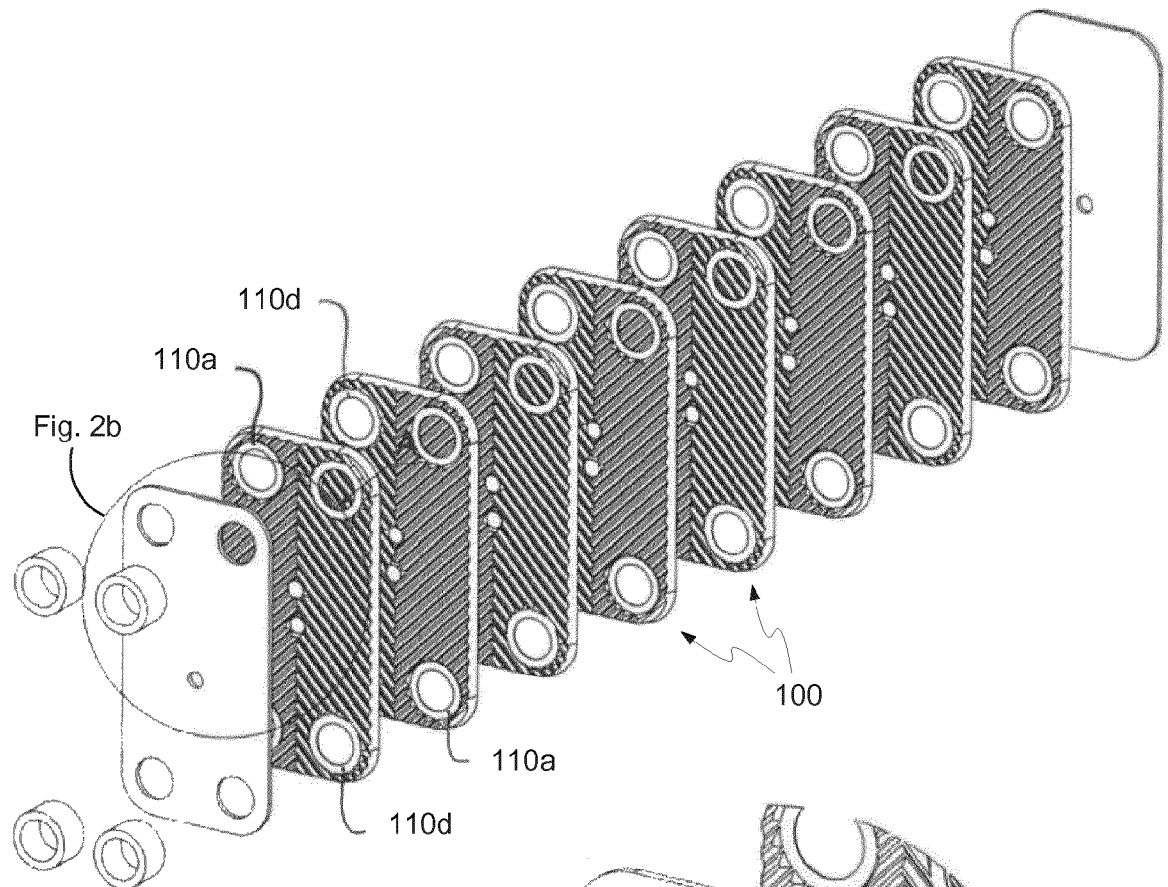
FIG. 2a is an exploded perspective view of a heat exchanger comprising eight heat exchanger plates according to FIG. 1.
Figure 2B:
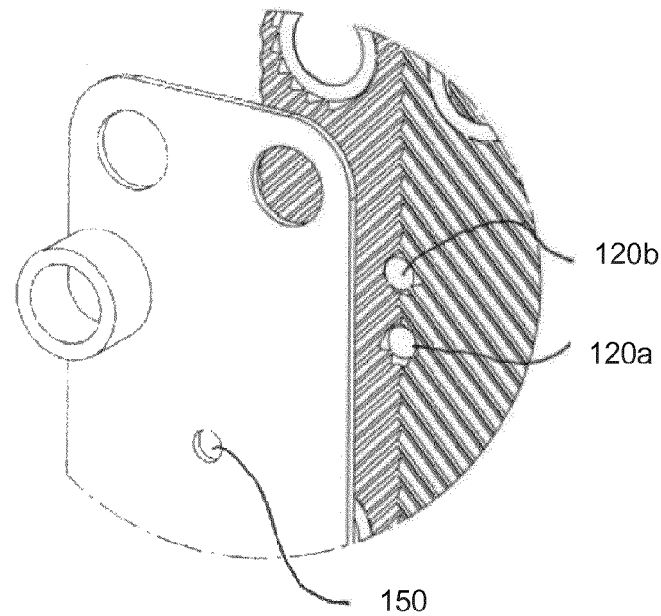

In FIGS. 1, 2a and 2b, a first embodiment is shown. With reference to FIG. 1, a heat exchanger plate 100 comprises four port openings 110a, 110b, 110c, 110d provided at different levels; the port openings 110a and 110c are provided at a low level and the port openings 110b and 110d are provided at a high level. Also, the heat exchanger plate 100 is provided with a pressed pattern of ridges R and grooves G, wherein the ridges R are provided at the same level as the port openings 110b and 110d and the grooves G are provided at the same level as the port openings 110a and 110c and wherein the pressed pattern is provided in a herringbone pattern. Moreover, the heat exchanger plate 100 comprises two plan areas 120a, 120b, located along a central axis extending along a length of the heat exchanger plate 100. The plan area 120a is provided at a low level, i.e. the same level as the grooves G and the port openings 110a, 110c and the plan area 120b is provided at a high level, i.e. the same level as the ridges R and the port openings 110b, 110d.

In order to form a heat exchanger from the heat exchanger plates, the heat exchanger plates are placed in a stack (shown exploded in FIG. 2a), wherein every other heat exchanger plate is turned 180 degrees around a central axis extending perpendicular to a plane of the heat exchanger plate. Due to every other plate being turned around the central axis, the herringbone patterns of neighboring plates will point in opposite directions; hence, contact points keeping neighboring plates on a distance from one another will be formed between the ridges and groves of the neighboring plates, hence forming interplate flow channels for media to exchange heat. Moreover, due to the port openings 110a, 110b, 110c and 110d being provided at different levels, there will be selective communication between the port openings and the interplate flow channels in a way well known by persons skilled in the art of plate heat exchangers.

In the same way as the port openings 110a-110d cooperate to form selective communication between the port openings and the interplate flow channels, the plan areas 120a and 120b will provide for selective contact with one another. If one for a moment imagines the plate shown in FIG. 1 as an end or start plate, i.e. an outer plate of the stack of heat exchanger plates, the plan portion 120a of such plate will contact the plan portion 120b of a neighboring plate.

Once assembled, the stack of heat exchanger plates is brazed to form a heat exchanger. During the brazing process, surfaces of neighboring plates contacting one another will be brazed together, and possible narrow gaps will be filled with brazing material. As well known by persons skilled in the art of brazing, a brazing material is generally a metal or an alloy having a slightly lower melting point than the material it is to join, i.e. the base material which the heat exchanger plates 100 are made from.

Metals and alloys are excellent heat conductors—hence, heat will be transferred from a flow channel via two adjoining plan portions—it is hence possible to measure a temperature of a medium of a flow channel inside the outer flow channel.

In another embodiment, either of two adjoining plan areas 120a, 120b may be provided with a central opening. This central opening serves to decrease the plate thickness of the combined plan areas 120a, 120b and hence provides for a more efficient heat transfer than if the heat must be transferred through two plate thicknesses and brazing material.

By fastening a temperature sensor on the plan area of an outer heat exchanger plate, the plan area of which being in contact with a plan area of a neighbouring plate, it is possible to measure the temperature of the medium flowing through a plate interspace delimited by the second and third heat exchanger plates counted from the outer ends of the stack of heat exchanger plates.

Moreover, in some cases, the heat exchanger may be provided with cover plates 130, 140, serving to increase the pressure handling capability of the heat exchanger. If such cover plates are arranged at the ends of the stack of heat exchanger plates, an opening 150 may be provided in order to provide access to the plan area 120a of the outermost heat exchanger plate 100.

Figure 3:
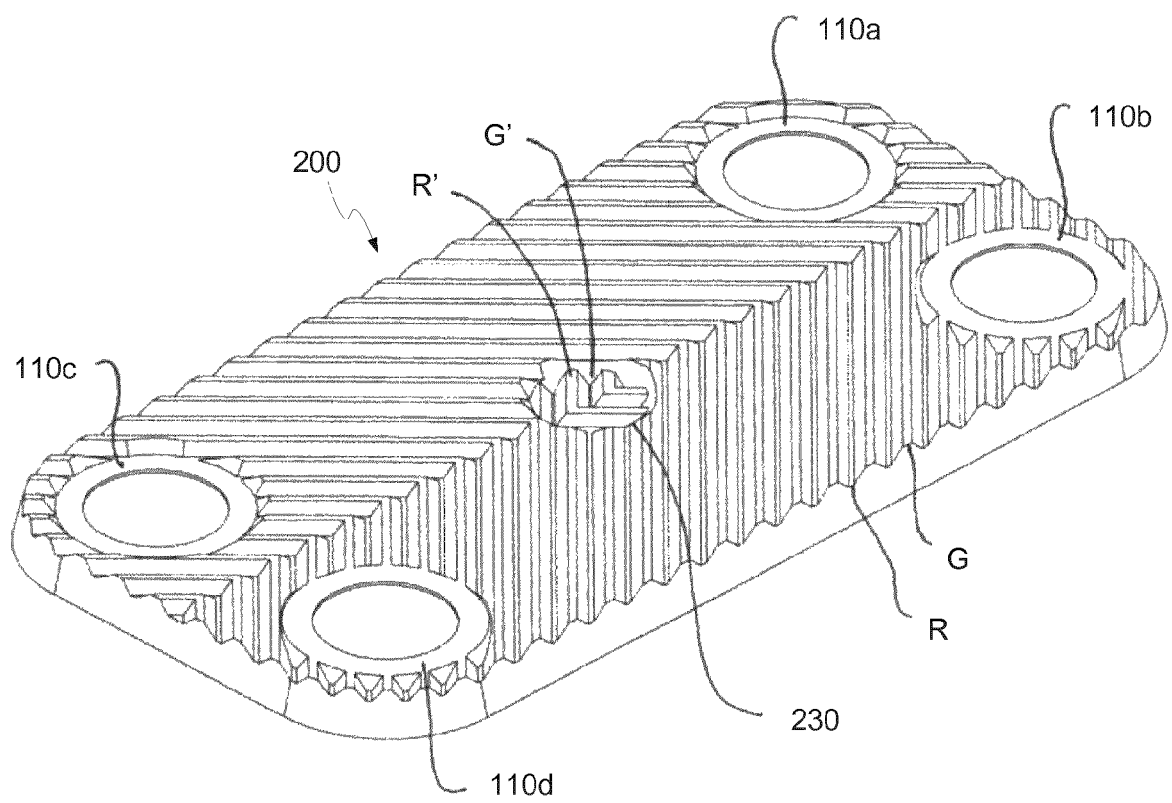
FIG. 3 is a perspective view of a heat exchanger plate comprised in a heat exchanger according to a second embodiment.
Figures 4A, 4B:
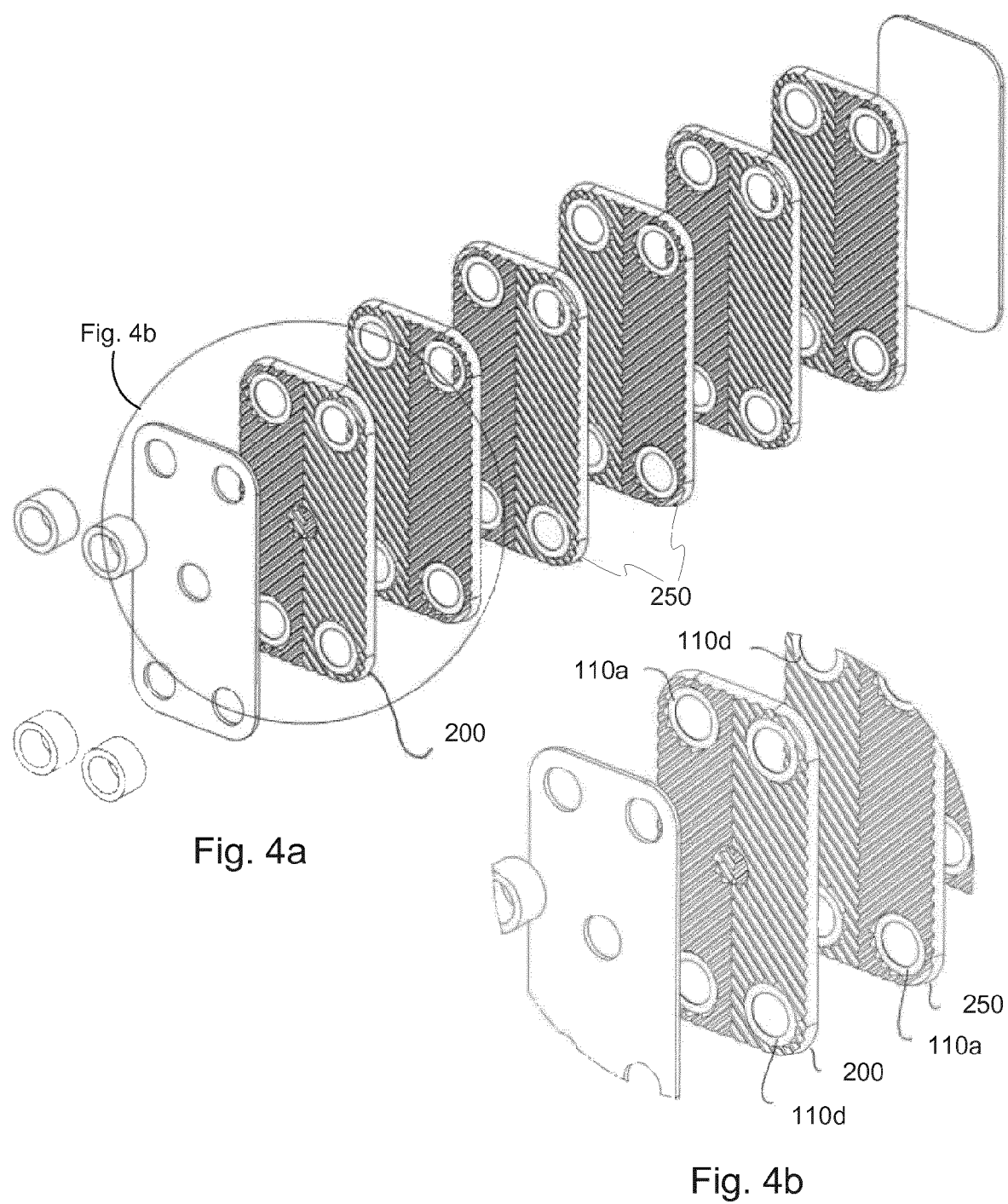

In FIGS. 3-4b, a second embodiment is shown. In FIGS. 3, 4a and 4b, components identical to the components of the first embodiment have been given the same reference numerals also in the second embodiment. With reference to FIG. 3, a heat exchanger plate 200 comprised in a heat exchanger according to the second embodiment is shown. The heat exchanger plate 200 is identical to the heat exchanger plates 100 according to the first embodiment, except in that the plan areas 120a and 120b have been replaced by a recessed portion 230.

The recessed portion 230 is provided with a pressed pattern of ridges R' and grooves G' identical to the ridges R and grooves G of a neighboring plate and are adapted to snugly fit within the pressed pattern of its neighboring plate.

In contrast to the first embodiment, the heat exchanger plate 200 is the only plate of its kind comprised in a heat exchanger according to the second embodiment. All other heat exchanger plates comprised in the heat exchanger according to the second embodiment are "plain" heat exchanger plates 250, i.e. heat exchanger plates without both plan areas 120a, 120b and recessed portions 230. This is beneficial for the heat exchange performance of the heat exchanger, since, however minute, the heat exchange performance of the heat exchanger will be negatively influenced by both the plan areas 120a and 120b of the first embodiment and the recessed portion 230 of the second embodiment.

With reference to FIGS. 4a and 4b, the arrangement of the heat exchanger plate 200 and its neighbouring heat exchanger plate 250 when placed in a stack to form a heat exchanger according to the second embodiment is shown. As can be seen therein, the herringbone patterns of the heat exchanger plate 200 and its neighboring plate 250 point in opposite directions—hence, contact points keeping the plate on a distance from one another under formation of interplate flow channels will be formed. In the recessed portion 230, however, a herringbone pattern pointing in the opposite direction vis-à-vis the herringbone pattern of the heat exchanger plate 200 is arranged. Consequently, this herringbone pattern will point in the same direction as the herringbone pattern of the neighboring heat exchanger plate 250, and by adjusting the phase of the herringbone patterns of the heat exchanger plate 250 and the recessed portion 230, a snug fit between the patterns may be achieved.

By the snug fit between the patterns, an efficient heat transfer from a second flow channel, i.e. a flow channel formed by the heat exchanger plates 250 neighboring the heat exchanger plate 200, will be formed, and by fastening a temperature sensor to the recessed portion 230, a temperature of the medium flowing in the second flow channel may be measured accurately.

It should be noted that also this embodiment can be provided with a central opening in the recessed portion 230 in order to further increase the heat transfer from the second flow channel to the sensor.

The invention claimed is:

1. A brazed plate heat exchanger comprising:
(a) a plurality of heat exchanger plates provided with a pressed pattern comprising ridges (R) and grooves (G), said ridges and grooves of neighboring plates contacting one another in order to keep the plurality of heat exchanger plates on a distance from one another under formation of interplate flow channels for media to exchange heat when the heat exchanger plates are placed in a stack to form the brazed heat exchanger, wherein the plurality of heat exchanger plates further comprise:
(i) a first heat exchanger plate comprising a first surface and a second surface, the first heat exchanger plate first surface being an outer surface of the brazed plate heat exchanger and having a first plan area, and the second surface of the first heat exchanger plate having a second plan area, wherein the second plan area is opposite the first plan area;
(ii) a second heat exchanger plate comprising a first surface and a second surface, the second heat exchanger plate first surface having a third plan area in contact with the second plan area;
(iii) a third heat exchanger plate comprising a first surface and a second surface;
(iv) a first interplate flow channel located between first heat exchanger plate second surface and the second heat exchanger plate first surface for flow of a first fluid therethrough; and
(v) a second interplate flow channel located between the second heat exchanger plate second surface and the third heat exchanger plate first surface for flow of a second fluid therethrough; and (b) a temperature sensor located on said first plan area of said first heat exchanger plate first surface to measure, from said first plan area of said first heat exchanger plate, a temperature of the second fluid in the second interplate flow channel, wherein the temperature sensor does not extend through said first heat exchanger plate, and wherein the temperature sensor is configured to measure the temperature of the second fluid in said second interplate flow channel as a result of thermal conductivity through the first heat exchanger plate and the second heat exchanger plate as a result of the third plan area contacting the second plan area so that heat of the second fluid in said second interplate flow channel conducts through the second heat exchanger plate and the first heat exchanger plate and is measured by the temperature sensor at the first plan area.

2. The brazed plate heat exchanger according to claim 1, wherein the second plan area of said first heat exchanger plate and the third plan area of said second heat exchanger plate are plane portions arranged to abut one another and hence allow for heat transfer from the second fluid in the second interplate flow channel to the temperature sensor.

* * * * *